United States Patent [19]

Tunze

[11] Patent Number: 4,622,991
[45] Date of Patent: Nov. 18, 1986

[54] EVAPORATION SENSOR FOR AN AQUARIUM

[76] Inventor: Norbert Tunze, Wankstr. 39, D-8122 Penzberg, Fed. Rep. of Germany

[21] Appl. No.: 589,150

[22] Filed: Mar. 13, 1984

[51] Int. Cl.⁴ .................... F16K 31/18; F16K 33/00
[52] U.S. Cl. ............................. 137/386; 119/5; 137/393; 137/434; 200/84 R; 417/40
[58] Field of Search .......... 137/386, 434, 393, 101.27; 119/5; 200/84 R; 417/40

[56] References Cited

U.S. PATENT DOCUMENTS

| | | | |
|---|---|---|---|
| 2,739,939 | 3/1956 | Leslie | 137/428 |
| 2,809,752 | 10/1957 | Leslie | 137/428 UX |
| 2,981,228 | 4/1961 | Brandano | 119/5 |
| 3,303,819 | 2/1967 | Wade | 119/5 |
| 3,468,288 | 9/1969 | Cassil | 119/5 |
| 3,512,646 | 5/1970 | Willinger | 119/5 |
| 4,206,719 | 6/1980 | Faris | 119/5 |
| 4,275,995 | 6/1981 | Taylor | 417/40 |
| 4,399,338 | 8/1983 | Jones | 200/84 R |

FOREIGN PATENT DOCUMENTS 3127268 1/1983 Fed. Rep. of Germany .......... 119/5

Primary Examiner—George L. Walton
Attorney, Agent, or Firm—Fred Philpitt

[57] ABSTRACT

For detecting small level changes in an aquarium, there is proposed a sensor which, in the operable condition, comprises a substantially enclosed sensor container (18), into which aquarium water can be sucked from the surface via an overflow edge (56) and from the aquarium interior via a suction port (46) with a downstream overflow tube (52). The sucking of the water over these two paths is effected by a circulating pump (26) of the aquarium filter system via an outlet port (32) of the sensor container (18). The liquid level in the sensor container is monitored by a level sensor (64). The upper edge of the overflow tube (52) is located beneath the overflow edge of the container wall by a specified distance. If water losses from the aquarium arise, the water surface in the sensor container drops to a considerably greater extent than the water surface in the aquarium external chamber does.

19 Claims, 4 Drawing Figures

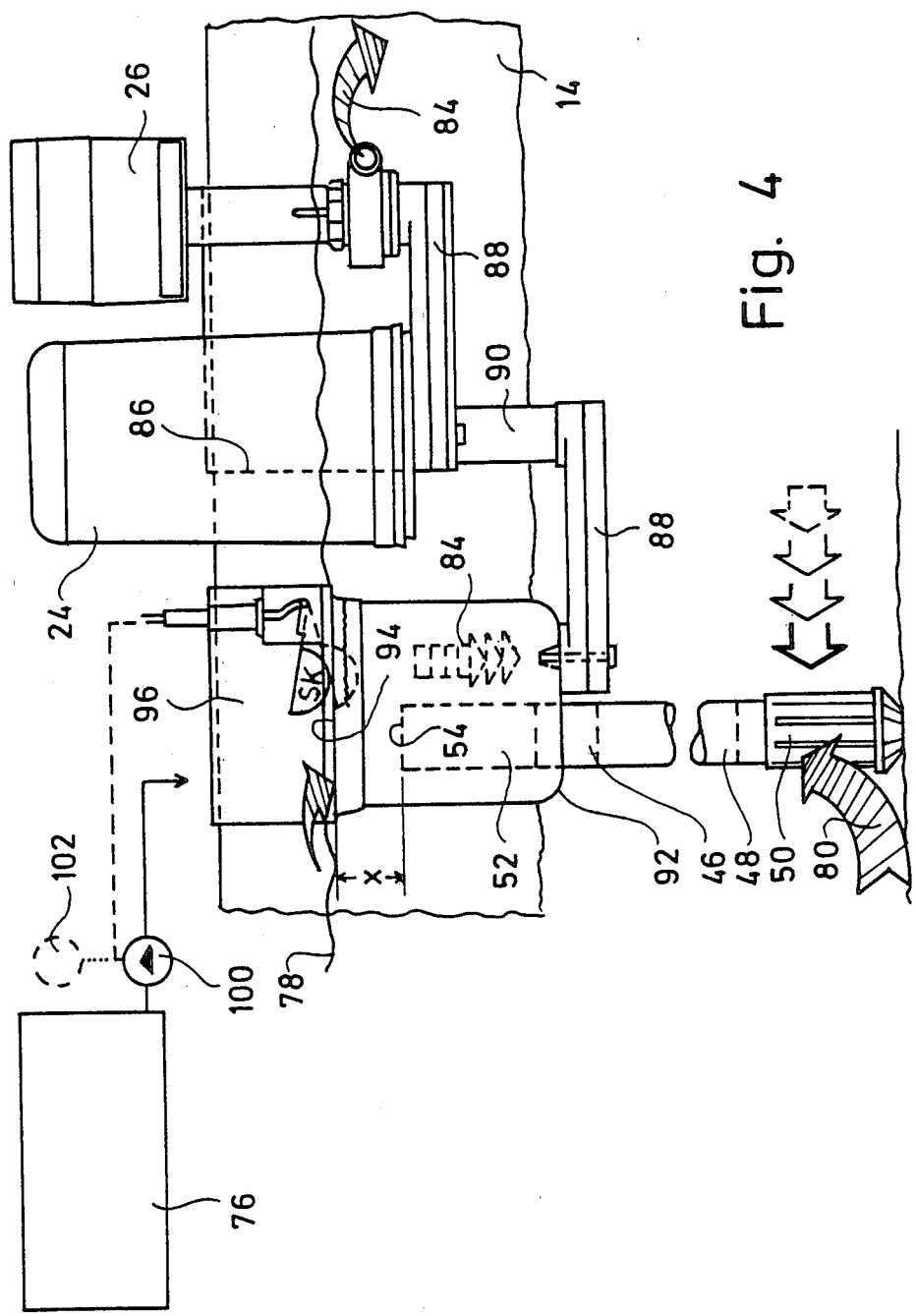

EVAPORATION SENSOR FOR AN AQUARIUM

The invention relates to an evaporation sensor for an aquarium.

Unlike corresponding open waters, fresh-water and sea-water aquaria hold a limited volume of water. Depending on the prevailing ambient temperature, more or less water evaporates continuously from the aquarium so that the water level drops accordingly. This dropping of the water level can only be detected with the eye when a considerable quantity of water has evaporated. The evaporation of a major quantity of water from an aquarium results in the concentration of substances contained in the water, e.g. the salt content, being increased. If the aquarium is topped up with water after the loss of a major quantity of water (water with a low salt content in the case of sea-water aquaria), then the concentration of the substances dissolved in the aquarium water is changed (reduced) within a very short time. However, such abrupt concentration changes in the aquarium environment are very harmful for fish and water plants in the aquarium since these organisms are accustomed to very constant environmental conditions such as are found in the wide expanses of water in nature, wherein they live.

In order to bring about a corresponding constancy of the environmental conditions in an aquarium, it would be necessary to replace even small evaporated quantities of water quasi-continuously. With visual checking of the water level this is however impossible.

It is therefore the object of the present invention to provide an evaporation sensor for an aquarium which makes available, even if the evaporation quantities are small, a control signal which can be used for a water topping-up device.

According to the invention, this problem is solved by an evaporation sensor as described hereinafter.

Sensors for monitoring a liquid level are indeed known from other fields of application (e.g. oil storage tank level indicators and the like). They have sensor inlet members (e.g. floats) which co-operate directly with the liquid surface. If one used a level sensor of this type for topping up an aquarium with water, then a relatively large quantity of water would have to evaporate before the level sensor responds. By contrast, in the case of the evaporation sensor according to the invention, there is effected in the interior of the sensor container an exaggeration of the level change which is brought about by the flow. No static measurement of the position of the water surface occurs; on the contrary, there is monitored under dynamic conditions in the sensor container, which has a small cross-sectional area compared to the aquarium, the movement of the water surface found therein. For the water surface in the interior of the sensor container is adjusted in dependence on the ratio of the volumes of the surface flow sucked in via the overflow edge and the water flow sucked in via the suction port from the aquarium interior. For the generation of these two water flows there is used the filter circulating pump which is already provided in most of the aquaria. Since the liquid level in the sensor container reacts very sensitively to changes in the position of the surface of the aquarium water, one already receives a large mechanical input signal for the level sensor provided in the sensor container.

The evaporation sensor according to the invention also causes the aquarium water surface to be kept constant to a certain extent, since the evaporation of water initially leads to a corresponding drop of the water surface in the sensor container, whilst the position of the water surface in the aquarium itself remains substantially constant.

The fact that the quantity of water in an aquarium can be kept constant by the evaporation sensor according to the invention has the additional advantage that the water surface cannot form a plurality of successive salt marks, which considerably impair the appearance of an aquarium.

It will be understood that there is no need for the sensor container to be covered completely; one or two of its walls may be formed by sections of the aquarium containers themselves, on which the sensor container is then placed tightly, if necessary with the interposition of seals.

The evaporation sensor according to the invention consists of only a few simple parts which can be manufactured at low cost by plastics material injection-moulding.

Since the partial water flow sucked in from the surface is passed over the overflow edge of the sensor container, there is no danger of the sensor being clogged by contaminants floating on the water surface. The evaporation sensor according to the invention additionally allows water to be selectively sucked in both from the aquarium water surface and from the aquarium water volume by the pump of the filter system. In this way, it is also possible to remove contaminants from the water surface without any problem.

Advantageous further developments of the invention are given in the hereinafter.

A further development of the invention ensures that fish living in the aquarium cannot in any event pass into the interior of the sensor container since the side walls thereof have been erected above the water surface. Nevertheless, the surface partial flow can continue to flow into the sensor container without hindrance.

A further development of the invention allows the volume partial flow to be sucked deeply from the interior of the aquarium water.

In a further development of the invention it is possible to set in a very simple manner the relationship between the surface partial flow and the volume partial flow relative to the entire flow sucked in by the pump of the filter system via the length of the overflow tube. The smaller the distance between the upper free edge of the overflow tube and the overflow edge, the larger the share of the surface partial flow in the entire water flow through the pump and the filter system. The shorter the overflow tube, the larger the share of the volume partial flow in the entire water flow through the filter system. Via the length of the overflow tube it is also easily possible to adapt the same evaporation sensor for use with circulating pumps of different capacities.

In a further development of the invention it is possible to adapt the evaporation sensor, at the location where it is used, to the respective conditions of use within the limits set by the longitudinal adjustment range of the overflow tube.

A further development of the invention in a simple manner limits the adjustment range of the overflow tube and ensures a reliable fit of the overflow tube following the adjustment thereof.

A further development of the invention is particularly advantageous because a mercury switch is a position pick-up which is well protected from external influences and, at the same time, is also suitable for the direct switching of relatively high electric power.

A further development of the invention makes it possible to use the same injection-moulded standard supporting container segments for a sensor container which serve for the reception of filter bowls of the filter system. This renders possible a particularly rational and low-cost production of a sensor container; since the supporting container segments are block-shaped or prismatic, there thus also comes about a particularly pleasing appearance of the unit, formed by the evaporation sensor, the filter and the pump, for the treatment of the aquarium water.

A further development of the invention is of advantage with respect to the accommodation of a long overflow edge on a small mounting surface.

Further developments of the invention ensure a fully automatic regulation of the position of the water surface in an aquarium so that the aquarium provides, without any human involvement, a constant environment for organisms in the aquarium over long periods of time.

It goes without saying that the above-described advantages are also obtained if water is lost from the aquarium other than by evaporation. In the case of sea-water aquaria, this may be water which is lost with the scumming of harmful substances.

Hereinafter, the invention will be explained in more detail with the aid of exemplified embodiments and with reference to the accompanying drawings, in which:

FIG. 4 shows a lateral, partly cut-away view of a modified aquarium water treatment system in which the water surface is kept constant automatically.

Figure 1:
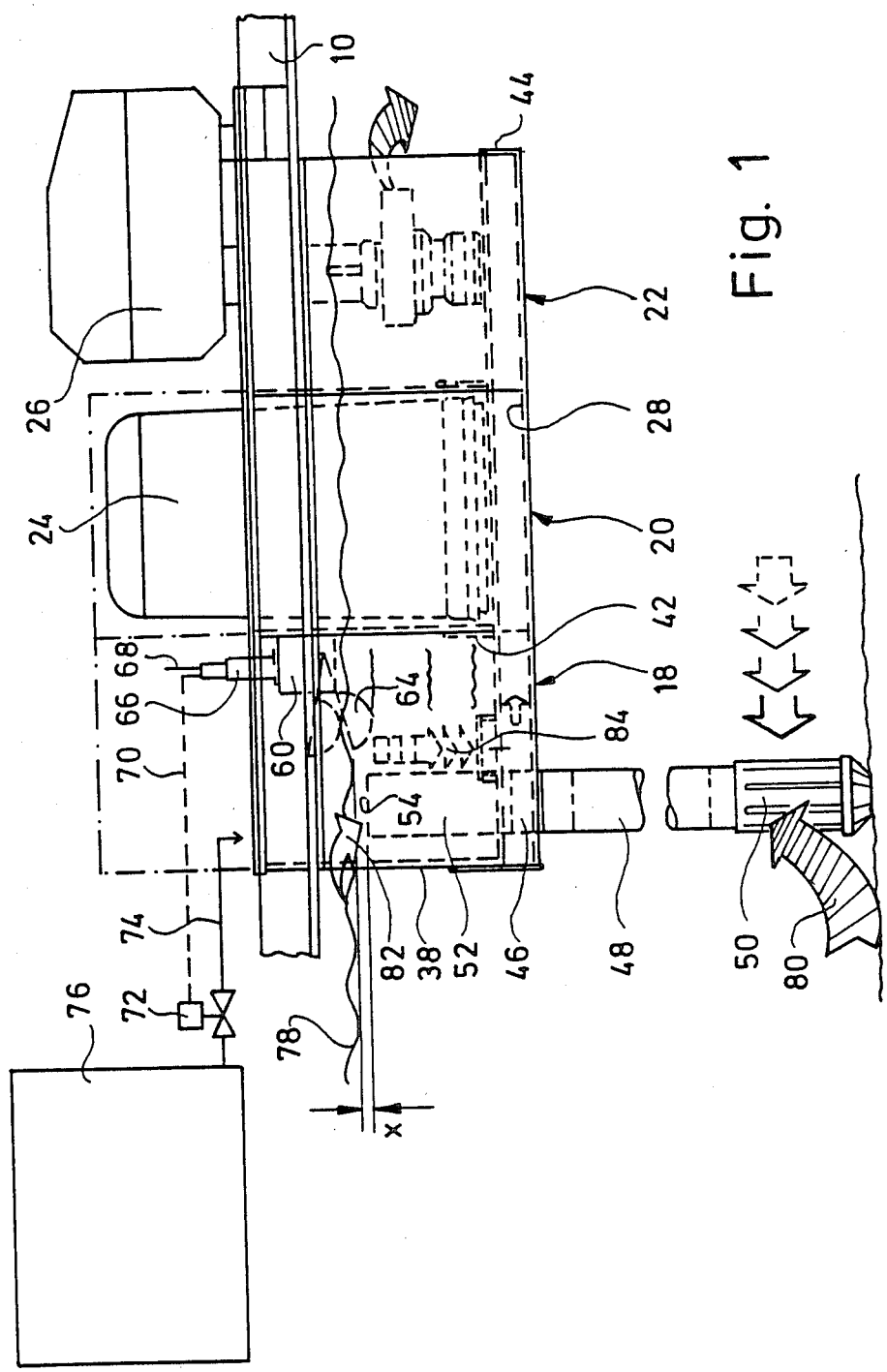
FIG. 1 shows a lateral, partly cut-away view of an aquarium water treatment system with an evaporation sensor serving for keeping the water surface constant.
Figure 2:
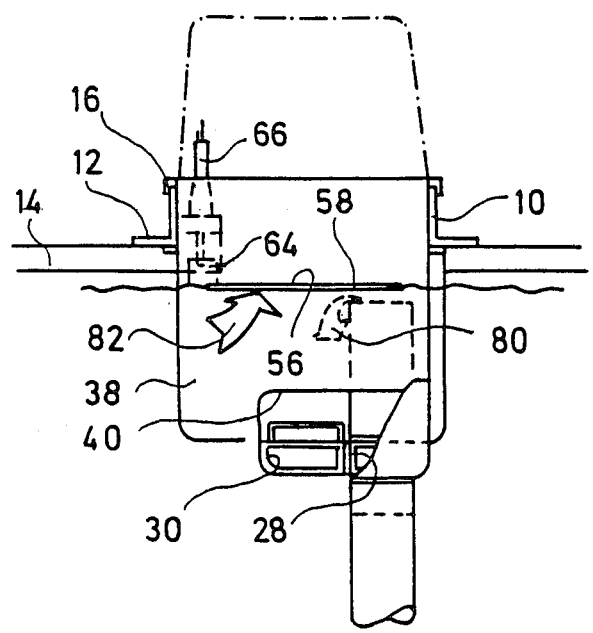
FIG. 2 shows a lateral view of the treatment system according to FIG. 1, as viewed from the left therein.

In FIGS. 1 and 2, supporting rails, which are L-shaped in cross-section and rest on opposite walls 14 of the aquarium container, are designated 10, 12. The supporting rails 10, 12 sit in integrally formed holding ribs 16 of standard containers 18, 20, 22 which are substantially identical in design. The standard container 18 serves as a sensor container, the standard container 20 serves for the reception of a bowl-type filter 24 and the standard container 22 serves for the reception of a centrifugal circulating pump 26.

Suction channels 28 and discharge channels 30, which extend in the longitudinal direction of the supporting rails 10, 12, have been integrally formed with the bases of the standard containers 18 to 22. In the bases of the standard containers there is provided respectively one central discharge port 34, which is connectable to the outlet socket of a bowl-type filter and is in communication with the discharge channel 30, and a lateral inlet port 32, which is in communication with the suction channel 28 and via which the water which has been mechanically purified by the bowl-type filter is discharged.

In the pump container 22, the inlet port 32 is shut by a lid not shown and the suction port of the circulating pump 26 is connected to the discharge port 34 associated with the discharge channel 30. In the sensor container 18, the discharge port 34 communicating with the discharge channel 30 is shut by a lid 36.

In the side walls 38 of the standard containers 18, 20, 22 which are on the left-hand side in FIG. 1, there is respectively provided a port 40 which, in view of small sockets surrounding the suction ports and discharge ports, is provided for injection-moulding technique reasons and is shut by a lid 42. The free ends of the channels 28, 30 are shut by lids 44, the lids 42 and 44 being initially manufactured as units which are connected via a predetermined separating point and which allow the side wall 38 of the sensor container 18 to be directly shut. Through the suction channel of the sensor container 18 there extends a tubular socket 46, on which there has been placed, at the bottom, a suction tube 48 leading into the interior of the aquarium. This tube carries at its free end a fitted-on slotted head 50.

Onto the upper end of the socket 46 there has been placed an overflow tube 52, whose upper free edge 54 is located by a distance x beneath the lower edge 58 of a slot 56, which edge constitutes an overflow edge, the slot being additionally provided in the side wall 38 of the sensor container 18.

Diametrically opposite to the socket 46, with respect to the container axis, there has been fixedly fitted to the side wall of the sensor container 18 a bearing block 60. Therein, a swivel arm 62 for a float 64 has been hinged, and into the swivel arm 62 there has been installed a mercury switch which is not shown in detail and whose contacts are connected to a plug 66.

The plug 66 is connectable to a supply line 68, on the one hand, and to a control line 70, on the other hand, via which line a solenoid valve 72 is operated. The latter has been inserted into a water topping-up line 74 which leads from a storage tank 76, which is arranged above the aquarium, to the aquarium.

The above-described aquarium filter system works as follows:

Water is sucked by the circulating pump 26 via the discharge channel 30 of the filter supporting container 20. This water has travelled through the bowl-type filter 24 and passes thereinto via the suction channel 28 of the filter supporting container 20 and of the sensor container 18. The water can pass into the suction channel 28 of the sensor container 18 in two ways: On the one hand, from the water surface of the aquarium shown at 78, as indicated by an arrow 82, and, on the other hand, via the suction tube 48 and the overflow tube 52, as indicated by an arrow 80. The two partial flows 80, 82 are united in a combined flow 84 which exits the sensor container via the port 32 which constitutes an inlet port if the container is used as a filter container.

If the free surface of the aquarium water drops due to evaporation or any other loss of water, then the partial flow 82 is reduced. Since the circulating pump 26 operates at a constant capacity, the partial flow 80 is increased, and this leads to a marked drop of the water level in the interior of the sensor container 18. This level drop is only experienced in the dynamic filter operation; if the circulating pump 26 is at a standstill the water level in the sensor container 18 is of course set to the same height as the water level in the external chamber.

The level changes in the interior of the sensor container 18, which are considerable compared to the level changes in the external chamber, are followed by the float 64, and when it has been lowered by a specified distance the mercury switch carried by the swivel arm 62 is actuated so that the solenoid valve 72 is opened. Now water flows under the effect of gravity from the storage tank 76 into the sensor container 18 or at another point into the aquarium container until the float 64 has again that position in which the mercury switch opens. Since—as stated—the level changes in the sensor container 18 are considerable compared to the level changes in the external chamber of the aquarium, one obtains a constant quasi-continuous replacement of the aquarium water losses along with very small changes in the total water quantity and the position of the surface of the aquarium water.

If desired, one can reduce the sensitivity of the evaporation sensor if circulating pumps of very high capacity are used in that one provides in the socket 46 a few openings, through which water can directly pass into the suction channel 28 of the sensor container 18 while by-passing the overflow tube 52. This partial water flow is then left out of consideration for the displacement of the float 64.

FIG. 4 shows a further modified constructional form, wherein no standard containers are used. On the contrary, the centrifugal circulating pump 26 and the bowl-type filter 24 sit directly on a holding angle 86 which rests on the wall 14 of the aquarium container and is fastened thereto by a clamp not shown. The connection between the suction port of the circulating pump 26 and the outlet port of the bowl-type filter 24 is provided by a hollow connecting part 88. On the suction port of the bowl-type filter 24 there has been fitted a suction tube 90 which is connected via another connecting part 88 to the outlet port of a cup-shaped sensor container 92. The free upper edge of the latter constitutes an overflow edge 94. The sensor container is connected via a holding angle 96, which has been welded to the top of the sensor container 92, to the wall 14 of the aquarium container in a similar manner as the unit consisting of the pump and the filter bowl.

The sensor container 92 again has a socket 46, a suction tube 48, which has been fitted on the latter from the bottom, and an overflow tube 52, which has been fitted on the socket at the top. The components 60 to 66 are again carried by the holding angle 96.

The mercury switch which is connected to the plug 66 and which is moved with the float 64 serves for triggering an electrically driven hose pump 100. This makes it possible to arrange the storage tank 76 beneath the aquarium container in a base cabinet or to mount it at a relatively long distance from the aquarium container.

As indicated in broken lines, the mercury switch, which is moved together with the float 64, can also be used for triggering a diaphragm compressor 102 which is capable of pressurising the interior of the storage tank 76. In this case, the storage tank 76 is connected to the interior of the aquarium container simply by a hose line.

Figure 3:
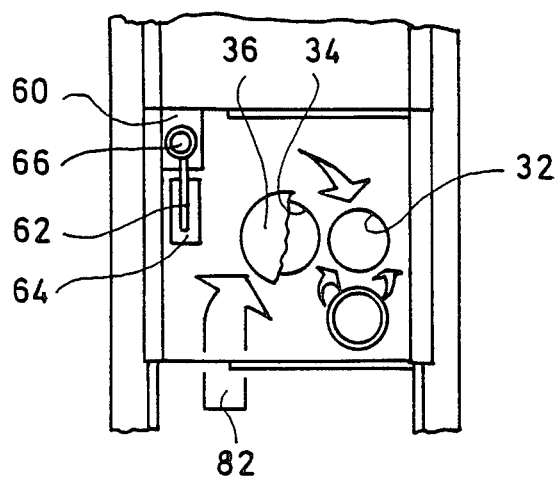
FIG. 3 shows a top view of the evaporation sensor of the treatment system shown in FIG. 1.

As regards keeping the water volume in the aquarium container constant, the treatment system shown in FIG. 4 operates in exactly the same way as the above-described system shown in FIGS. 1 to 3.

In a practical exemplified embodiment, the lower edge 58 of the approximately 2 to 3 mm wide slot 56 is located approximately 1 mm below the water surface in the aquarium if the upper edge of the overflow tube 52 is located approximately 3 mm below the water surface and there is used a circulating pump with a capacity of 200 l/h. If a more powerful pump with a capacity of approximately 1500 l/h is used, the upper edge of the overflow tube 52 is chosen to be approximately 8 mm below the upper edge of the water. Similar relationships between the position of the overflow edge 94 and the height of the overflow tube 52 apply to the exemplified embodiment shown in FIG. 4.

I claim:

1. An evaporation sensor for an aquarium comprising
   (a) a sensor container,
   (b) support means to mount said sensor container within the perimeter of said aquarium,
   (c) an overflow edge located near the upper portion of a side wall of said sensor container, said overflow edge being positioned so that it is a slight distance below the desired level of the water in the aquarium and so that water will flow from the aquarium over it when the water in the aquarium is at the desired level,
   (d) a passageway in the lower portion of said sensor container which permits water to be drawn into the sensor container from the aquarium at a point below the surface of the water in the aquarium,
   (e) an overflow tube that has its lower end connected to said passageway and which extends upwardly therefrom to a point a short distance below said overflow edge,
   (f) pump means connected to said sensor container to draw water from said passageway and then outwardly through said sensor container, and
   (g) water level sensing means positioned within the upper portion of said sensor container to detect a drop in the level of the water in the sensor container and which can activate means to add further water to the aquarium.

2. A sensor as set forth in claim 1 wherein said overflow edge is formed by the lower edge of a horizontal slot located in the side wall of the sensor container.

3. A sensor as set forth in claim 1 wherein said passageway (d) includes a suction tube that extends downwardly from the base of the sensor container.

4. A sensor as set forth in claim 1 wherein said overflow tube is mounted in a longitudinally adjustable manner on a socket that forms a part of said passageway.

5. A sensor as set forth in claim 4 wherein said socket has a slightly conical outer surface, and said overflow tube is of cylindrical configuration and made of an elastically expandable material.

6. A sensor as set forth in claim 1 wherein said sensing means comprises a float and a position pick-up which is coupled to the float.

7. A sensor as set forth in claim 1 wherein the sensor container is formed by a prismatic standard supporting container segment, which also serves to receive a filter container and a pump, which segment is supported by rails on the aquarium container and which segment has adjacent its base a suction channel and a discharge channel, and that in this segment an outlet port provided for connection to said filter container, which port is closable by a lid and said passageway (d) is bounded by a length of tube which passes through one of said integrally formed channels in a tight manner.

8. A sensor as set forth in claim 1 wherein the sensor container is cup-shaped having an upper edge that constitutes the overflow edge and to which there is fastened a holding angle which is adapted to be fitted to an aquarium container wall.

9. A device according to claim 1 which includes a storage tank adjacent the aquarium with an outlet for discharging water into said aquarium, a valve in said outlet, and means for interconnecting said valve and said water level sensing means.

10. An evaporation sensor for an aquarium comprising
(a) a sensor container,
(b) support means to mount said sensor container within the perimeter of said aquarium,
(c) an overflow edge located near the upper portion of said sensor container, said overflow edge being positioned so that it is a slight distance below the desired level of the water in the aquarium and so that water will flow from the aquarium over it when the water in the aquarium is at the desired level,
(d) a passageway in the lower portion of said sensor container which permits water to be drawn into the sensor container from the aquarium at a point below the surface of the water in the aquarium, and
(e) pump means connected to said sensor container to draw water from said passageway and then outwardly through said sensor container, and
(f) water level sensing means positioned within the upper portion of said sensor container to detect a drop in the level of the water in the sensor container and which can activate means to add further water to the aquarium.

11. A sensor as set forth in claim 10 wherein said overflow edge is formed by the lower edge of a horizontal slot located in the side wall of the sensor container.

12. A sensor as set forth in claim 10 wherein said passageway (d) includes a suction tube that extends downwardly from the base of the sensor container.

13. A sensor as set forth in claim 10 wherein an overflow tube extends upwardly from said passageway (d) into the interior of the said container and has an open upper edge that terminates a short distance below said overflow edge.

14. A sensor as set forth in claim 10 wherein said overflow tube is mounted in a longitudinally adjustable manner on a socket that forms a part of said passageway.

15. A sensor as set forth in claim 14 wherein said socket has a slightly conical outer surface and said overflow tube is of cylindrical configuration and is made of an elastically expandable material.

16. A sensor as set forth in claim 10 wherein said sensing means comprises a float and a position pick-up which is coupled to the float.

17. A sensor as set forth in claim 10 wherein the sensor container is formed by a prismatic standard supporting container segment, which also serves to receive a filter container and a pump, which segment is supported by rails on the aquarium container and which segment has adjacent its base a suction channel and a discharge channel, and that in this segment an outlet port provided for connection to said filter container, which port is closeable by a lid, and said passageway (d) is bounded by a length of tube which passes through one of said integrally formed channels in a tight manner.

18. A sensor as set forth in claim 10 wherein the sensor container is cup-shaped having an upper edge that constitutes the overflow edge and to which there is fastened a holding angle which is adapted to be fitted to an aquarium container wall.

19. A device according to claim 10 which includes a storage tank adjacent the aquarium with an outlet for discharging water into said aquarium, a valve in said outlet and means for interconnecting said valve and said water level sensing means.

* * * * *